J. B. CONINE.
MACHINE FOR GATHERING STONES.
APPLICATION FILED SEPT. 4, 1913.
1,106,190.
Patented Aug. 4, 1914.
3 SHEETS—SHEET 2.
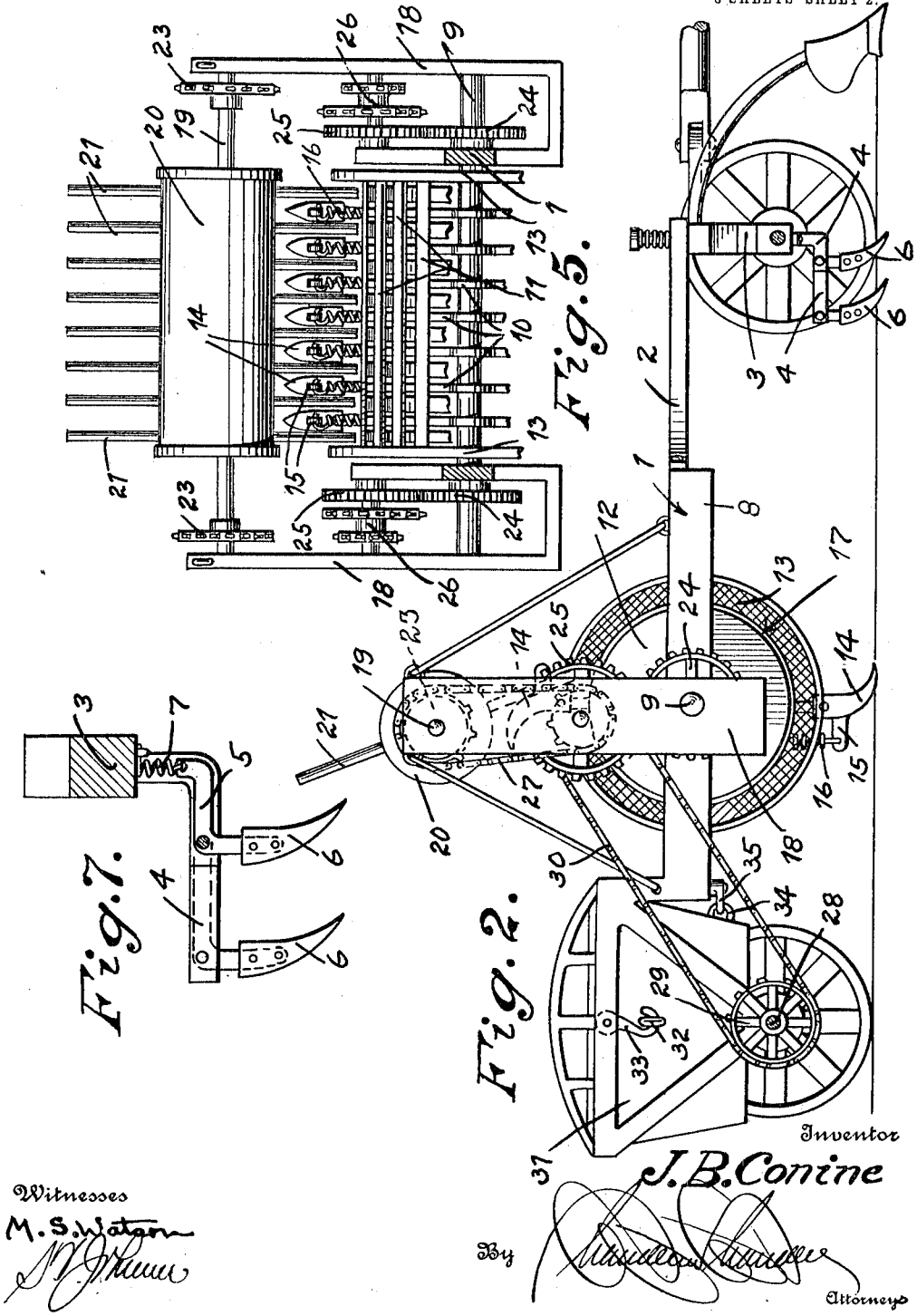

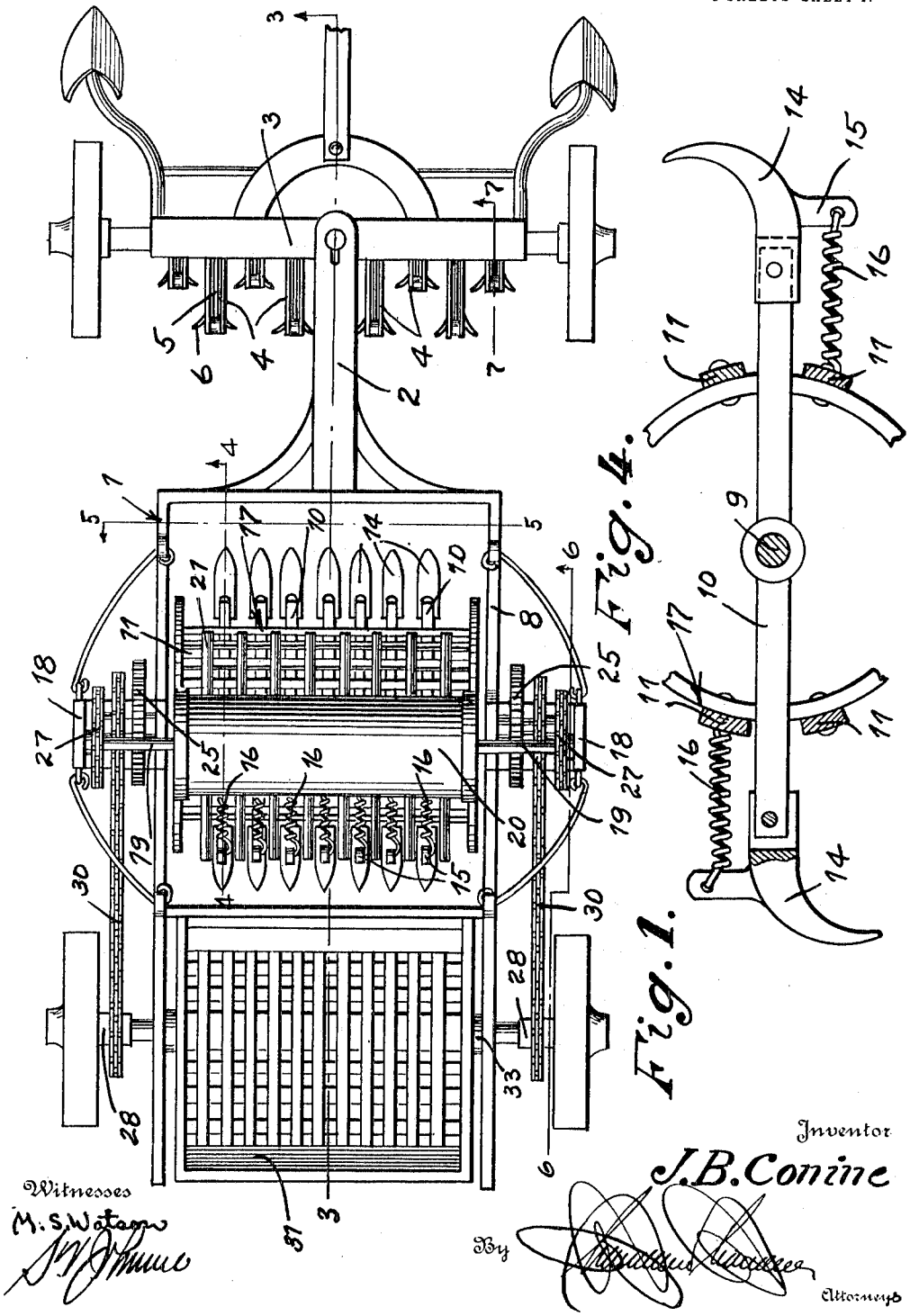

J. B. CONINE.
MACHINE FOR GATHERING STONES.
APPLICATION FILED SEPT. 4, 1913.
1,106,190.
Patented Aug. 4, 1914.
3 SHEETS—SHEET 3.
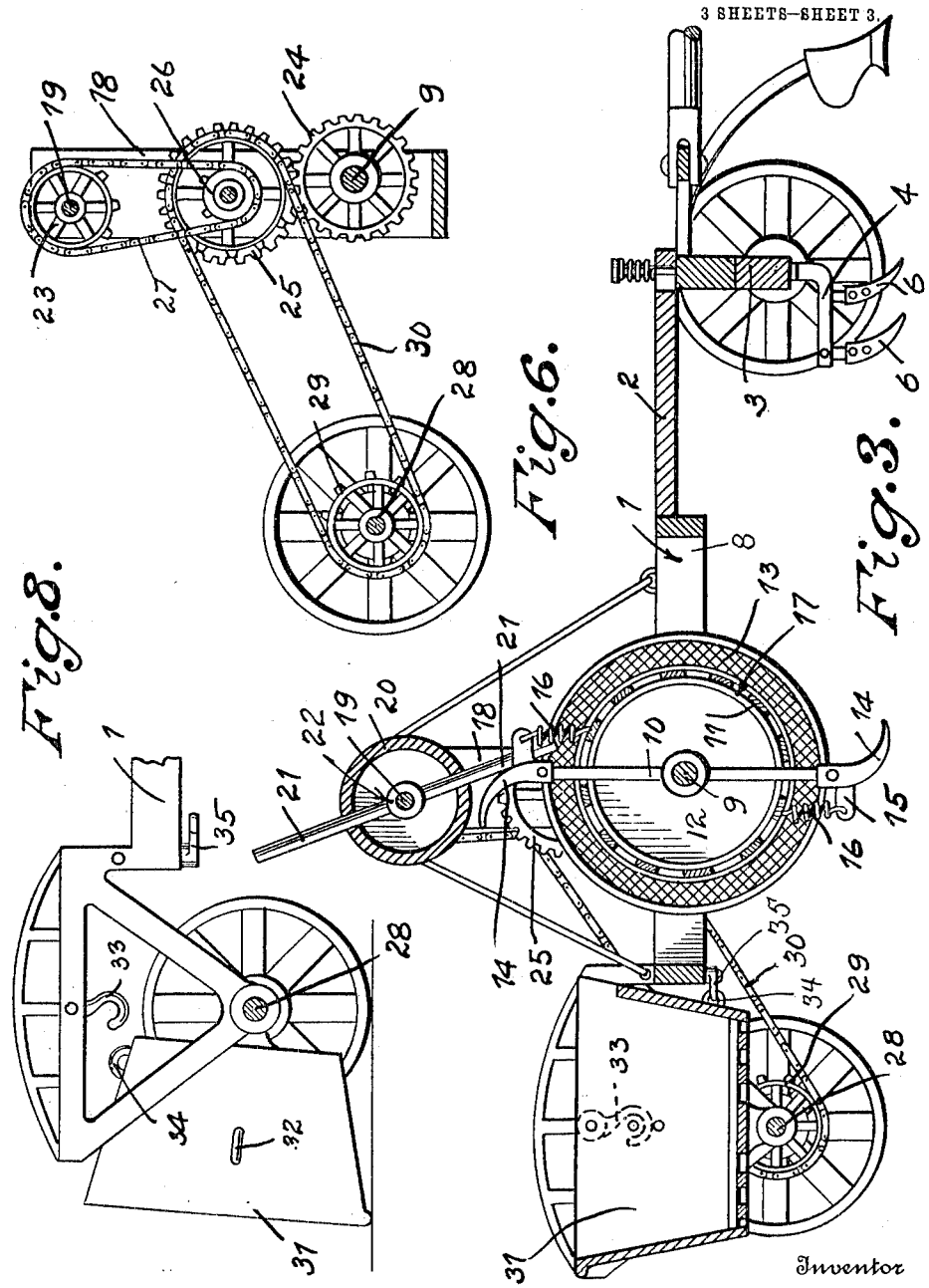

UNITED STATES PATENT OFFICE.

JAMES B. CONINE, OF CAMP HILL, ALABAMA.

MACHINE FOR GATHERING STONES.

1,106,190.   Specification of Letters Patent.   Patented Aug. 4, 1914.

Application filed September 4, 1913. Serial No. 788,142.

*To all whom it may concern:*

Be it known that I, JAMES B. CONINE, a citizen of the United States, residing at Camp Hill, in the county of Tallapoosa, State of Alabama, have invented certain new and useful Improvements in Machines for Gathering Stones; and I do hereby declare the following to be a full, clear, and exact description of the invention, such as will enable others skilled in the art to which it appertains to make and use the same.

The present invention is directed to improvements in machines for gathering stone from fields to condition the same for tillage.

The invention has for its object to provide a machine of this character so constructed that the stones or other undesirable objects may be quickly removed from the field during the passage of the machine thereover.

A further object of the invention is to provide a machine which will gather the stones or the like and deposit the same in a receptacle supported by the frame of the machine.

A still further object of the invention is to provide means for positively dislodging stones gathered by the pickers so that the same will be deposited in the receptacle.

With these and other objects in view, this invention resides in the novel features of construction, formation, combination and arrangement of parts to be hereinafter more fully described, claimed and illustrated in the accompanying drawing, in which:—

Figure 1 is a top plan view of the device. Fig. 2 is a side elevation. Fig. 3 is a sectional view on line 3—3 of Fig. 1. Fig. 4 is a similar view on line 4—4 of Fig. 1. Fig. 5 is a similar view on line 5—5 of Fig. 1. Fig. 6 is a similar view on line 6—6 of Fig. 1. Fig. 7 is a similar view on line 7—7 of Fig. 1. Fig. 8 is a fragmentary view of the rear end of the frame, showing the receptacle in its dumping position.

Referring to the drawing, the numeral 1 designates a frame, to the forward end of which is connected an extension 2, said extension being connected to the bolster 3. The bolster 3 is provided with a plurality of beams 4, each of which is provided with a pivotally connected standard 5, said standards having their lower ends provided with shovels 6, and their upper ends connected to the bolster by coil springs 7. The beams 4 are of different length so that the shovels 6 will be disposed in zig-zag relation, said shovels serving to dislodge stones or similar objects as the machine is drawn across the field.

Journaled in the side bars 8 are the opposite ends of the shaft 9 to which are fixed the centers of the bars 10, said bars having their opposite ends projected between certain of the slats 11, said slats being connected at their ends to the disks 12, said disks being surrounded by wire mesh flanges 13. Pivotally connected to the ends of the bars 10 are pickers 14, said pickers being provided with lugs 15 to which are connected one of the ends of the coil springs 16, the other ends of which are connected to certain of the slats 11. The slats and disks form in effect a drum 17, which will permit dirt dislodged from the gathered stones to pass therethrough. Each side bar 8 is provided with a vertical upright 18 in the upper ends of which are supported the opposite ends of the shaft 19, said shaft being surrounded intermediate its ends with a sheet metal drum 20 from which are projected the opposite ends of the rods 21, said rods having their central portion engaging the shaft 19, as at 22.

Fixed to the opposite ends of the shaft 19 are gears 23, similar gears 24 being fixed to the opposite ends of the shaft 9. The gears 24 mesh with the gear 25, which is supported by the vertical uprights 18. The gears 25 are provided with gears 26, which are of less diameter than the gears 25. Trained around the gears 23 and 26 are sprocket chains 27.

The rear end of the frame 1 is supported by a wheeled axle 28, the ends of which have fixed thereto gears 29. Trained around the gears 25 and 29 are sprocket chains 30, which transmit rotary movement to the gears 23 and 24, thereby rotating the drum 17 and 20 in opposite directions. The rotation of said drums is timed so that when the pickers 14 are in the position as shown in Fig. 3, the rods 21 will pass between said pickers, and as the same are rotating at greater speed than the pickers the stones gathered by the pickers will be projected by the rods into the receptacle 31 which is removably connected to the rear end of the frame 1. The receptacle is provided with eyes 32 upon its sides for detachably engaging the hooks 33 carried by the frame, so that when it is desired to dump the gathered stones it is only necessary to disengage the hooks from said eyes, whereupon the receptacle can be dumped, as shown in Fig. 8. The front of the receptacle is provided with an eye 34 which is normally engaged with the latch 35 carried by the frame, said latch serving, when engaged in said eye to hold the receptacle in its receiving position.

By providing the coil springs 16 for the pickers it is obvious that said pickers will be permitted to swing if encountering a stone of large size, thereby preventing breaking of the pickers. The coil springs 7 perform the same function for the shovels 6, which are designed especially for loosening the earth so that the pickers 14 may readily engage the stones or the like.

In the drawings there is illustrated a single line of rods 21 and picker bearing bars 10, but it will be of course understood that others may be provided without departing from the spirit of the invention.

What is claimed is:—

1. In a stone gathering machine, the combination with a wheeled frame, of upper and lower drums rotatably supported thereby, the lower drum being provided with spaced slats, bars passing through the lower drum and having their projected ends passing between certain of the slats pickers pivotally connected to the outer ends of the bars, springs connecting the pickers and slats, rods passable through the upper drum and having their ends adapted to pass the pickers at intervals, and means for driving the drums in opposite directions.

2. In a stone gathering machine, the combination with a wheeled supported frame, of a receptacle supported thereby, vertical uprights supported by the frame, upper and lower drums supported by shafts which are journaled upon the uprights, bars having their central portions connected to the supporting shaft of the lower drum, pickers pivotally connected to the ends of the bars and connected to the lower drum by springs, rods carried by the upper drum, said drums being rotated in opposite directions, whereby the ends of the rods and pickers will pass each other, said rods being adapted to dislodge stones lifted by the pickers to project the same into the receptacle.

In testimony whereof, I affix my signature, in the presence of two witnesses.

JAMES B. CONINE.

Witnesses:
J. T. FARISS,
J. H. RODGERS.